United States Patent [19]
Tsune

[11] Patent Number: 5,974,927
[45] Date of Patent: Nov. 2, 1999

[54] CIRCULAR SAW CUTTING MACHINE

[75] Inventor: Ryoichi Tsune, Toyama, Japan

[73] Assignee: Tsune Seiki Co., Ltd., Japan

[21] Appl. No.: 08/890,190

[22] Filed: Jul. 9, 1997

[30] Foreign Application Priority Data

Jul. 12, 1996 [JP] Japan .................................. 8-183428

[51] Int. Cl.[6] .............................. B23D 19/00; B26D 7/02
[52] U.S. Cl. ............................. 83/490; 83/452; 83/471.2; 83/526
[58] Field of Search ........................... 83/490, 452, 526, 83/471.2

[56] References Cited

U.S. PATENT DOCUMENTS

| | | | |
|---|---|---|---|
| 2,783,843 | 3/1957 | Seybold | 83/526 |
| 3,083,603 | 4/1963 | Peterson | 83/526 |
| 3,540,338 | 11/1970 | Saratoga et al. | 83/471.2 |
| 3,727,505 | 4/1973 | Shaughnessy | 83/526 |
| 3,982,456 | 9/1976 | Krylov et al. | 83/490 |
| 3,994,192 | 11/1976 | Faig | 83/490 |
| 4,145,940 | 3/1979 | Woloveke et al. | 83/68 |
| 4,694,721 | 9/1987 | Brickner, Jr. | 83/471.3 |
| 4,843,932 | 7/1989 | Weber et al. | 83/490 |
| 5,024,130 | 6/1991 | Hays, Jr. | 83/526 |
| 5,720,096 | 2/1998 | Dorsey | 83/417.2 |

*Primary Examiner*—M. Rachuba
*Assistant Examiner*—Sean A. Pryor
*Attorney, Agent, or Firm*—Schweitzer Cornman Gross & Bondell LLP

[57] ABSTRACT

A circular saw having a cutting position for cutting a workpiece at a predetermined location thereof, a gripper for gripping a workpiece at a predetermined location on the workpiece, a drive having a plurality of gears including final and penultimate stage gears, and a backlash eliminator for braking the final stage gear for eliminating backlash between the final and the penultimate stage gears upon the initiation of cutting a workpiece at the cutting position.

4 Claims, 4 Drawing Sheets

CIRCULAR SAW CUTTING MACHINE

FIELD OF THE INVENTION

The present invention relates to a circular saw which holds a workpiece to be cut by a vise and cuts the work at a predetermined location thereof by a disc shaped circular saw blade rotated by saw drive means, the saw also including a plurality of stages of driving gears.

BACKGROUND OF THE INVENTION

In circular saws of the type described above, upon starting of the cutting of the workpiece to be cut by rotation of the saw, vibration or impact can occur in the saw due to a backlash between a final stage gear and an earlier stage gear engaging each other in the saw drive. Such vibration or impact on the saw inherently degrades the accuracy of the cutting of the workpiece and can cause damage to the saw.

SUMMARY OF THE INVENTION

It is an object of the present invention to provide a circular saw having a backlash eliminator for eliminating backlash between a final stage gear and a former stage gear engaging each other in the drive of the saw upon the commencement of the cutting of a workpiece by the rotating saw blade.

Another object of the present invention is to provide a circular saw with a backlash eliminator for eliminating backlash with certainty and by a simple operation.

The present invention is a circular saw for gripping with a vise workpiece to be cut at a predetermined location thereof, and cutting the workpiece to a predetermined dimension by a saw blade driven to rotate by a saw drive having a plurality of gears, and having a backlash eliminator provided a final stage gear of the saw driving means for braking the final stage gear to eliminate backlash to be caused between the final stage gear and a preceding stage gear meshing with the final gear, upon initiation of cutting of the work by a saw. Preferably, the backlash eliminator comprises a brake gear meshing with the final stage gear, a brake disc integrally provided with a brake shaft, on which the brake gear is mounted, a pair of calipers respectively carrying brake pads gripping from both sides of predetermined peripheral portion of the brake disc, and a actuation cylinder for driving the caliper between a braking position where the pass grips the brake disk and a release position where the brake pads are placed away from the brake disc.

BRIEF DESCRIPTION OF THE DRAWING

The present invention will be understood more fully from the following detailed description and from the accompanying drawing wherein.

DETAILED DESCRIPTION

Figure 1:
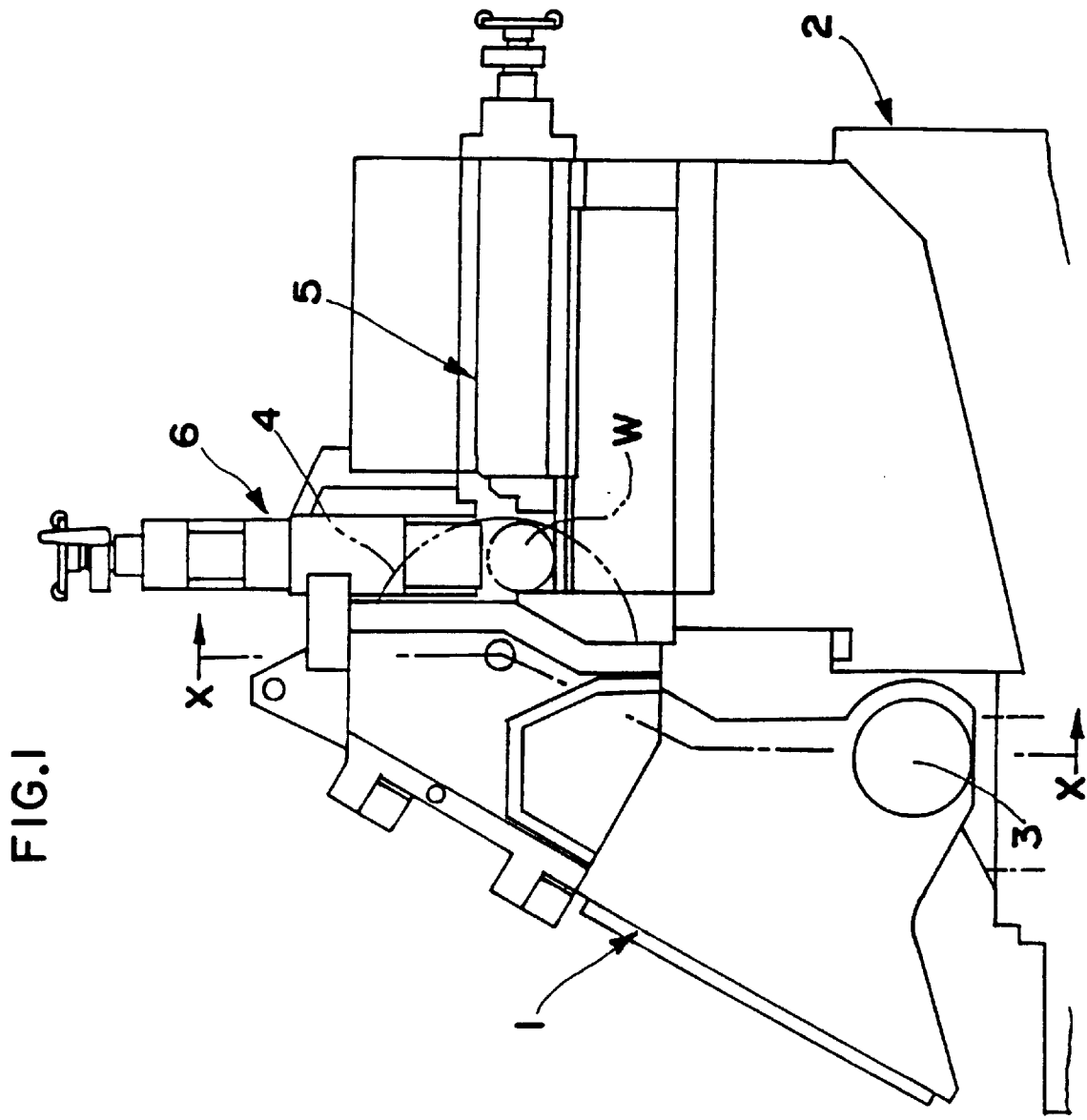
FIG. 1 is a front elevational view of a circular saw according to the present invention.

FIG. 1 shows a swing type circular saw cutting machine according to the invention, having a saw frame 1. The lower end of the saw frame 1 is pivoted on a base 2 by a pivot shaft 3. On the free end of the saw frame is open is opposite to its pivoted end, a circular saw blade 4 is installed as shown by a broken line. A transverse vise 5 is provided for holding and fixing a workpiece W to be transversely cut at a cutting position. A vertical vise 6 is provided for holding and firmly fixing the workpiece W in vertical direction.

Figure 2:
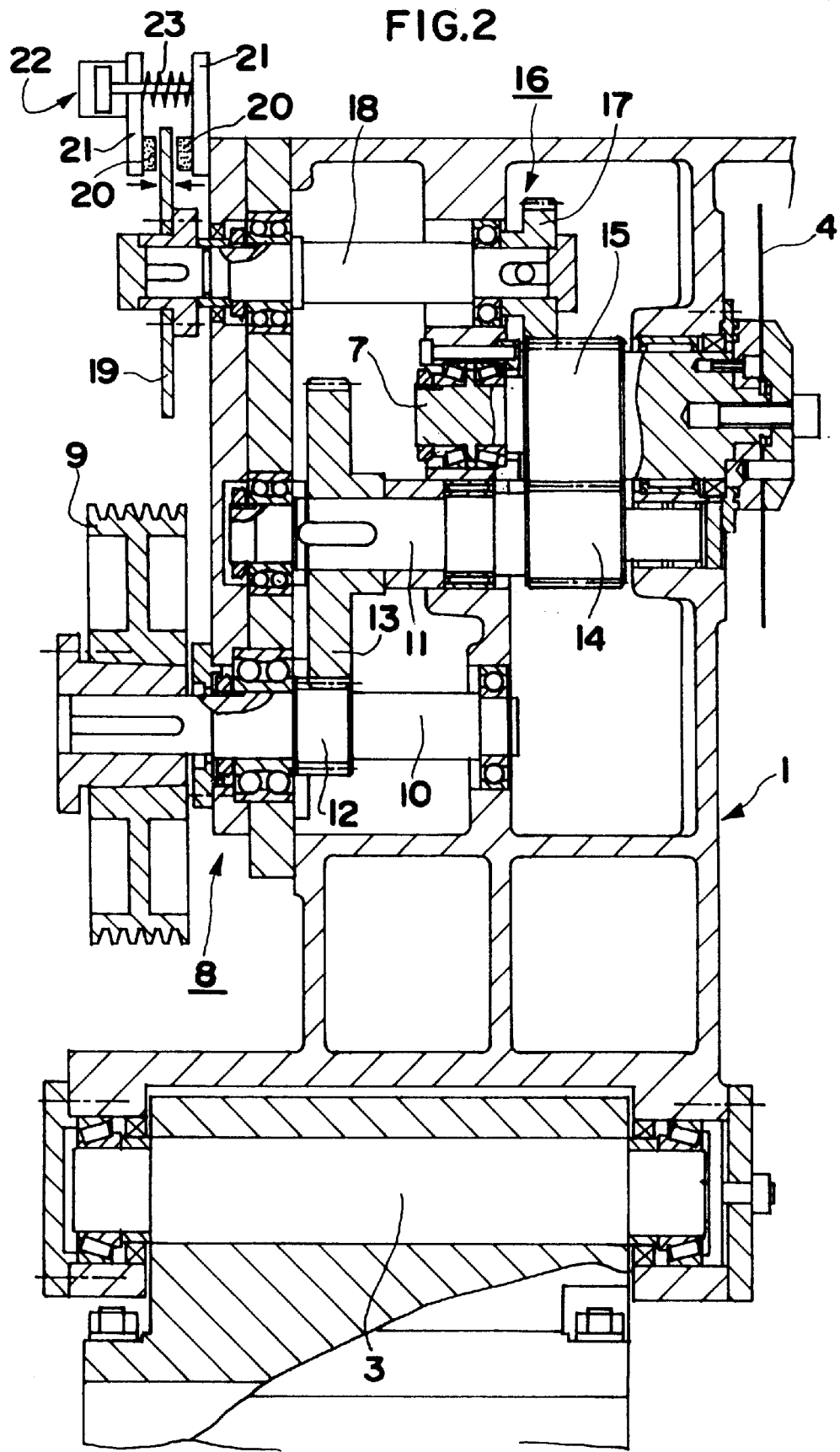
FIG. 2 is an enlarged cross-sectional view taken along line X—X of FIG. 1.

As shown in FIG. 2, the saw blade 4 is mounted at the tip of a saw shaft 7 journaled at the free end of the saw frame 1. The saw blade 4 is driven to rotate by a saw drive 8 including a plurality of geared driving stages. The saw drive 8 also includes a motor (not shown), a drive shaft 10 connected to the motor in a driving relationship by a drive belt (not shown) and a pulley 9, an intermediate transmission shaft 11 arranged between the drive shaft 10 and the saw shaft 7 parallel to the drive shaft 10, gears 12 and 13 for transmitting the rotation of the drive shaft 10 to the intermediate transmission shaft 11, and gears 14 and 15 for transmitting the rotation of the intermediate transmission shaft 11 to the saw shaft 7. The gear 15 is a final stage gear, and the gear 14 is an intermediate stage gear of the immediately preceding of the final stage gear 15.

A backlash eliminator 16 is provided on the final stage gear 15. The backlash eliminator 16 can temporarily apply braking to the final stage gear 15 upon the saw blade 4 initiating the cutting of the workpiece. This can be eliminated backlash between the final stage gear 15 and the preceding stage gear 14.

As shown in FIG. 2, the backlash eliminator 16 has a braking gear 17 meshing with the final stage gear 15. A brake disk 19 is provide on an end of a brake shaft 18 for rotation therewith. The brake shaft 18 carries the braking gear 17 at its end opposite to the end with the brake disk 19 thereon. A pair of calipers 21 having brake pads 20 sandwiching the disposed on each side of a circumferential portion of the brake disk 19. A hydraulic cylinder 22 alternating the calipers 21 to open and close between a braking position where both brake pads 20 grip the brake disk 19 for applying braking force, and a release position where the brake pads 20 are released from the brake disk 19.

Figure 3:
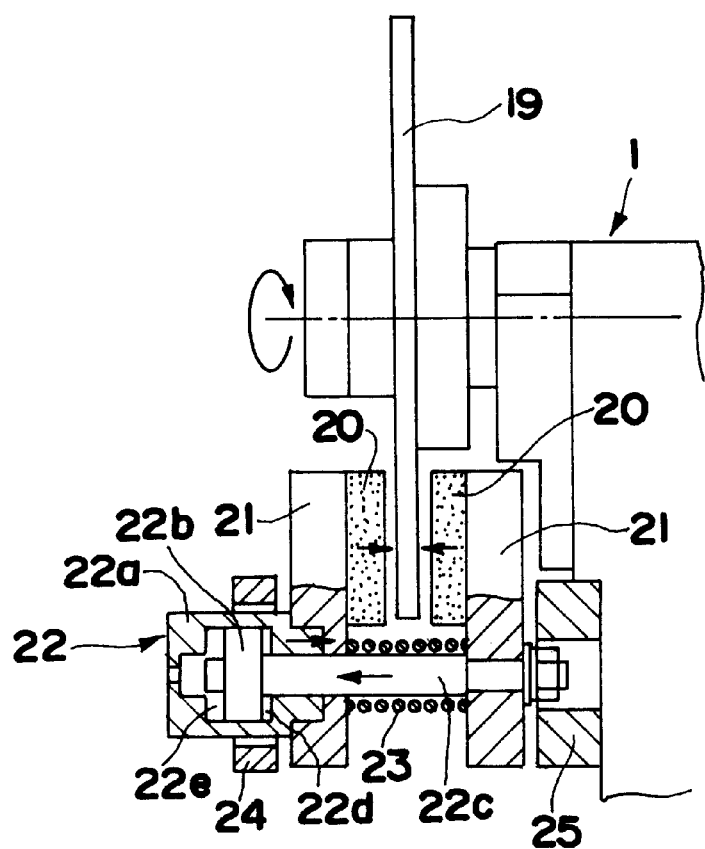
FIG. 3 is a plan view showing a brake mechanism forming a part of a backlash eliminator.
Figure 4:
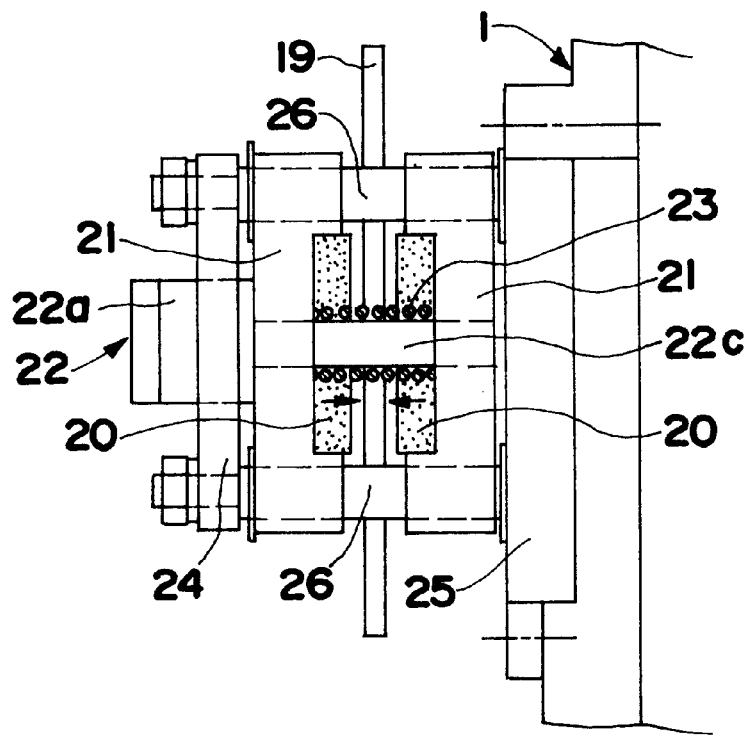
FIG. 4 is a bottom view of the brake mechanism shown in FIG. 3.

FIGS. 3 and 4 are respectively plan and bottom views showing details of the brake (19, 20, 21, 22) that is part of the backlash eliminator 16. Both calipers 21 are arranged independently of each other and are supported on a pair of guide rails 26 (FIG. 4) mounted on the saw frame 1 for movement toward and away from both sides of the brake disk 19 with maintaining them in parallel. A cylinder casing 22a of the hydraulic cylinder 22 is attached on one of the calipers 21. A piston rod 22c integrally formed with a piston 22b of the hydraulic cylinder 22, slidably extends through one of the calipers 21 for attachment to the other caliper 21. A coil spring 23 is wound around the piston rod 22c to bias both calipers 21 away from each other. The piston rod 22c is parallel to the guide rail 26. Stopper members 24 and 25 restrict respective outward movements of both calipers 21.

Both calipers 21 are constantly biased to away from each other by the coil spring 23. This keeps both brake pads 20 are held at their released positions away from the sides of the brake disk 19. By supplying a fluid to a hydraulic pressure chamber 22d of the hydraulic cylinder 22, both calipers 21 are moved toward each other against the bias of the coil spring 23, to grip the brake disk 19 by both brake pads 20 to apply a braking force to the brake disc 19. When the fluid pressure in the hydraulic pressure chamber 22d is relieved, both calipers 21 and 21 are returned by the coil spring 23 from their braking position to the release position. Pressure relief is provided by opening a chamber 22e at the opposite side of the hydraulic chamber 22d to the atmosphere.

By the braking mechanism (19, 20, 21, 22) described above, both calipers 21 are independent of each other and are driven between their braking position while keeping them and the release positions by the hydraulic cylinder 22 while keeping them parallel with the brake disk 19. Therefore, the brake pads 20 may contact the brake disk 19 while staying parallel to each other, to make the braking action effective. It should be noted that, while both calipers 21 are driven to open and close by a single hydraulic cylinder 22 in the brake mechanism it is possible to drive the calipers 21 to open and close by a pair of hydraulic cylinders arranged at respectively predetermined positions.

In use of the circular saw having the backlash eliminator in accordance with the present invention when the saw frame 1 is pivoted to approach the workpiece W with rotating the saw blade 4 at a predetermined speed by the saw drive 8, the backlash eliminator 16 is actuated temporarily to apply braking action to the final stage gear 15 to eliminate the backlash caused between the final stage gear 15 and the preceding stage gear 14 meshing with the final stage gear 15 upon initiation of cutting of the workpiece W by the saw blade 4.

As explained with reference to FIGS. 3 and 4, when the backlash eliminator 16 is actuated, when fluid pressure is supplied to the hydraulic pressure chamber 22d of the hydraulic cylinder 22, both calipers 21 are moved toward to each other to grip the brake disk 19 with both brake pads 20 and 20 to brake the rotating brake disk 19. The braking gear 17 is actuated by the brake shaft 18. Thus, by applying the brake for the brake gear 17, the final stage gear 15 meshing with the brake gear 17 is decelerated to eliminate backlash which would be otherwise caused between the final stage gear 15 and the preceding stage gear 14. Actuation of the backlash eliminator is performed within a short period from the initiation of pivoting motion of the saw 4 toward the workpiece W to be cut to the saw blade 4 actually contacting the workpiece W. The saw 4 will not cause vibration or impact when the saw 4 cuts into the work W, because backlash between the final stage gear 15 and the preceding stage gear 14 in the saw drive 8 are eliminated by the backlash eliminator 16. Accordingly, when a saw blade with a cemented carbide tip is used at a high speed rotation, the backlash eliminator 16 acts particularly effectively.

Figure 5:
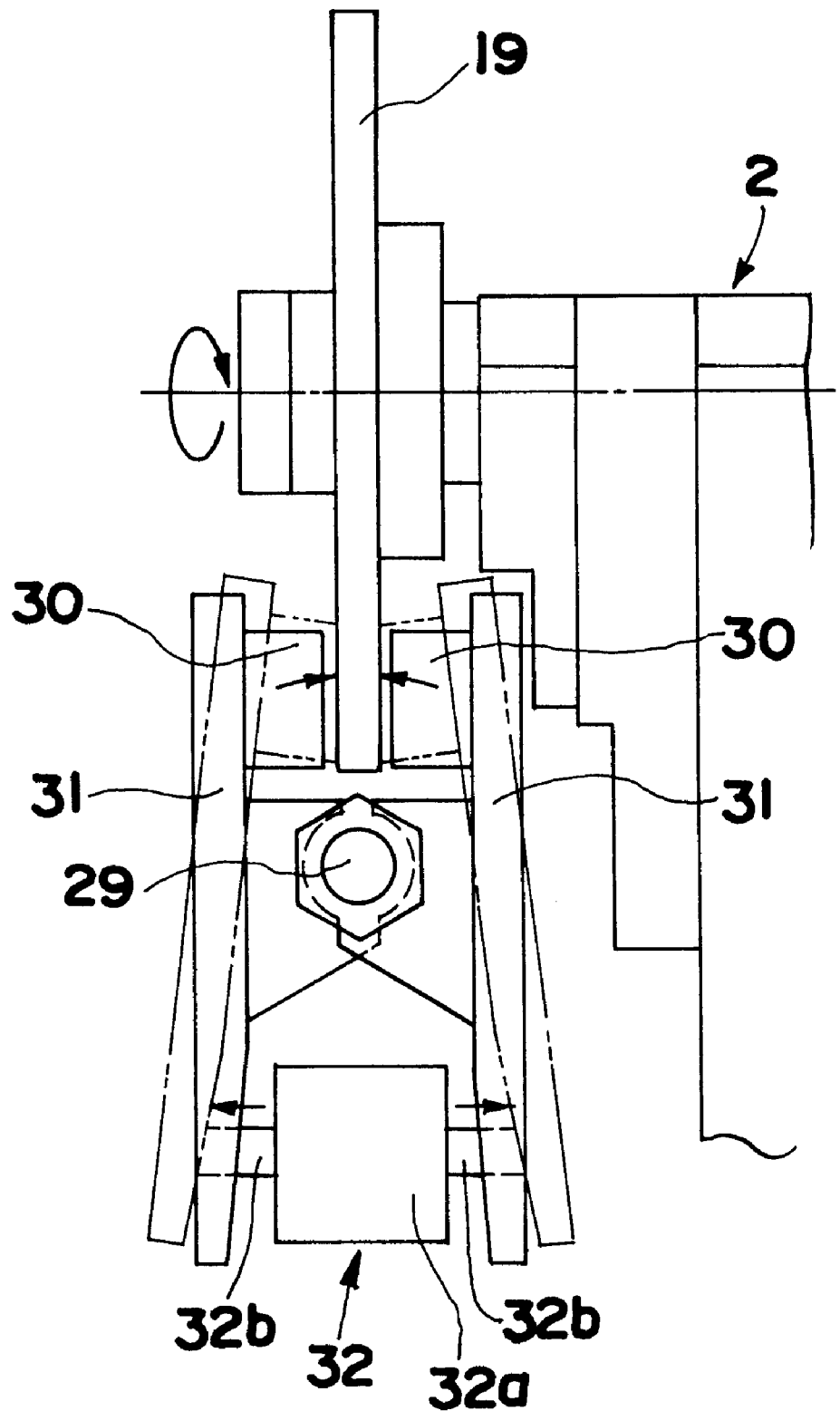
FIG. 5 is a plan view showing another embodiment of the brake mechanism forming a part of the backlash eliminator.

FIG. 5 shows another embodiment of the brake mechanism that is a part of the backlash eliminator 16. In this embodiment, both calipers 31 tilt about a pivot shaft 29 and brake pads 30 at the tips of the calipers 31 are alternately opened and closed about the pivot shaft. A pneumatic cylinder 32 drives the rear ends of the calipers 31, to open and to close them.

The pneumatic cylinder 32 has a pair of actuating rods 32b to be axially extended and withdrawn simultaneously at opposite ends of a cylinder casing. Both actuating rods 32b to be axially extended and withdrawn simultaneously at opposite ends of a cylinder casing. Both actuating rods 32b are cooperatively connected to the rear ends of the calipers 31. The cylinder casing 32a is fixed at a predetermined position. By extending both actuation rods at the rear ends of the calipers 31, their forward ends are closed to grip both sides of the broke disks by the brake pads 30 and 30 to apply the braking force to it. On the other hand, when the actuation rods 32b are pulled in by the cylinder 32, the forward ends of both calipers 31 are opened to release the brake pads 30 away from the brake disk 19. In this case, it is possible to place a spring (not shown) for constantly keeping open the front ends of both calipers.

The foregoing brake mechanism (29, 30, 31, 32) enable simplification of construction and permits compact structure at low production costs.

What is claimed is:

1. A circular saw which comprises
   (i) a cutting position for cutting with a saw blade a workpiece at a predetermined location thereof,
   (ii) means for gripping said workpiece at a predetermined location on the workpiece,
   (iii) a drive having a plurality of gears, including final and penultimate stage gears, said final gear being mounted on a common shaft with the saw blade, and
   (iv) a backlash eliminator in association with said final gear for braking said final gear for eliminating backlash between said final and said penultimate gears upon the initiation of cutting and during cutting a workpiece at said cutting position.

2. The circular saw of claim 1, wherein said backlash eliminator further comprises a brake gear meshing with said final stage gear, a brake shaft for mounting said brake gear, a brake disk having a peripheral portion and being integral with said brake shaft, a pair of two brake calipers each provided with brake pads for gripping a predefined part of said peripheral portion of said brake disk, and a hydraulic actuating cylinder for actuating said calipers between a braking position where said brake pads grip the brake disk, and a release position where said brake pads are located remote from said brake disk.

3. The circular saw of claim 2, wherein each of said calipers is adapted to move independently of the other caliper, said hydraulic actuating cylinder being adapted to dispose said calipers in a substantially parallel relationship to each other.

4. The circular saw of claim 2, wherein each of said calipers has a tip end and a rear end, and said calipers are pivotably connected to each other about a pivot shaft, for alternately opening and closing said tip and rear ends of said calipers about said pivot shaft.

* * * * *